United States Patent [19]

Burwasser et al.

[11] 4,404,574

[45] * Sep. 13, 1983

[54] ELECTROGRAPHIC PRINTING SYSTEM USING DIELECTRIC FILM MEMBER

[75] Inventors: Herman Burwasser, Boonton, N.J.; John R. Wyhof, Latrobe, Pa.

[73] Assignee: R.Q.O. Holding Company, Inc., Jamestown, N.Y.

[ * ] Notice: The portion of the term of this patent subsequent to Aug. 27, 1993, has been disclaimed.

[21] Appl. No.: 211,157

[22] Filed: Nov. 28, 1980

Related U.S. Application Data

[60] Continuation-in-part of Ser. No. 17,131, Mar. 5, 1979, which is a continuation of Ser. No. 806,379, Jun. 14, 1977, abandoned, which is a division of Ser. No. 718,361, Aug. 27, 1976, Pat. No. 4,112,172, which is a continuation-in-part of Ser. No. 669,675, Mar. 23, 1976, abandoned.

[51] Int. Cl.$^3$ .............................................. G01D 15/06

[52] U.S. Cl. ................................ 346/153.1; 355/3 R; 355/16

[58] Field of Search ...................... 355/3 R, 3 BE, 16; 346/153.1, 160

[56] References Cited

U.S. PATENT DOCUMENTS

| | | | |
|---|---|---|---|
| 3,248,216 | 4/1966 | Weigl | 346/160 X |
| 3,639,640 | 2/1972 | Gager | 427/121 X |
| 3,672,930 | 6/1972 | Trachtenberg | 430/48 |
| 3,997,343 | 12/1976 | Weigl et al. | 430/67 |
| 4,112,172 | 9/1978 | Burwasser et al. | 355/3 R X |

*Primary Examiner*—Fred L. Braun

*Attorney, Agent, or Firm*—Kane, Dalsimer, Kane, Sullivan and Kurucz

[57] ABSTRACT

A latent image is electrographically generated onto a dielectric record member from an energized electrode in close proximity with the dielectric layer of the member, and which image, if desired, may be readily developed and fixed. The system is particularly characterized in that the dielectric record member is a clear transparent, flexible film, which is made up of a resin film base, a conductive layer on the base, and a dielectric layer thereon. The dielectric layer has a thickness of about 1.4–10 micrometers. In the preferred embodiment of the invention, the dielectrtic layer includes an anti-blocking material which enables the film member to be unrolled from a roll holder and transported at a controlled rate uniformly and rapidly across an energized electrode so that a sufficient amount of charge can be transferred from the electrode to the film to provide a high contrast image.

5 Claims, 2 Drawing Figures

ELECTROGRAPHIC PRINTING SYSTEM USING DIELECTRIC FILM MEMBER

CROSS-REFERENCE TO RELATED APPLICATION

This application is a continuation-in-part of co-pending application Ser. No. 017,131, filed Mar. 5, 1979, which is a continuation of application Ser. No. 806,379, filed June 14, 1977, abandoned, which is a divisional of application Ser. No. 718,361, filed Aug. 27, 1976 now U.S. Pat. No. 4,112,172, which is a continuation-in-part of Ser. No. 669,675, filed Mar. 23, 1976, abandoned.

BACKGROUND OF THE INVENTION

1. Field of the Invention

This invention relates to electrography, and, more particularly, to an electrographic printing system for producing an image on a dielectric film member.

2. Description of the Prior Art

The art has recognized that images can be reproduced on a dielectric surface of an image member through various electrographic processes. In such processes, an electrostatic latent image is generated on the dielectric from a metallic electrode by air ionization. Usually, the electrostatic latent images are generated by character shaped stylus or pin electrodes which are brought into close proximity to a dielectric web supported on a base electrode. In such processes, a potential is applied across the electrodes below a critical stress value. Then transfer of the character or pin configuration from the electrode to the insulating web is effected by the use of a relatively low potential triggering or signal pulse which raises the electric field above a critical stress value required to produce a field discharge in the space between the insulating web and the base electrode. The discharge action gives rise to the formation of an electrostatic latent image of the character or pin on the insulating web. Thereafter, the generated image on the insulating web can be rendered visible by application of liquid or dry developer thereto, and fixed into a permanent image on the dielectric record member.

Electrography is useful in many applications where it is required that a voltage signal pulse be applied directly to a dielectric receiving member, e.g. in analog oscillographs, high speed line printers, digital plotters and the like.

In these systems, the dielectric record member was invariably dielectric-coated paper, which is prepared by impregnating a paper base or substrate with a conductive material and then coating the dielectric layer thereon. Apparently paper was used as the substrate material of the dielectric receiving member because it was believed that the substrate had to possess volume conductivity, that is, the base itself had to be conductive in order for the system to be operative. Thus the art employed paper only as the base material because paper could be easily impregnated through its thickness of the paper with a conductive material to achieve the desired volume conductivity in the base layer.

While such dielectric-coated papers are useful in these applications, it would be of considerable advantage to provide an electrographic printing system in which the electrostatic image is formed on a dielectric film record member. Films offer many advantages over paper since they can be handled easily, are durable, have a long shelf life, and multiple copies can be made readily. Most importantly, images formed on a transparent film member could be projected onto a screen and viewed by many persons simultaneously. These films would also permit overlay examination. The criteria for usefulness of such film record members in these applications, however, is that the images must be clear, sharp, of high-contrast, stable, and be available on a transparent base.

Accordingly, it is an object of this invention to provide an electrographic printing system in which electrostatic images are formed directly onto record members other than paper, and, more particularly, onto plastic film record members.

Another object of this invention is to provide an electrographic printing system in which such a film record member can be transported rapidly across character-generating electrodes to form clear, sharp images.

Still another object of this invention is to provide an electrographic printing system in which permanent images can be fixed into a dielectric film record member as clear, sharp images of high contrast, which may be viewed readily in an overhead projector.

In accordance with these objects, an effective electrographic printing system is provided in which the base of the dielectric imaging member is a plastic film on which is formed a layer of a conductive material, and including a dielectric layer coated on the conductive layer. The film record member of this invention is a three-layered structure, in which the base is plastic, instead of paper, is not conductive itself, and a conductive layer is sandwiched between the base and the dielectric layer. Another feature of this film member in the system is that the thickness of the dielectric layer is about 1.4–10 micrometers.

SUMMARY OF THE INVENTION

There is provided herein a novel electrographic printing system, wherein a latent image is electrographically generated onto a dielectric record member from an energized electrode in close proximity with the dielectric layer of said member, and which image, if desired, may be readily developed and fixed. The system is particularly characterized in that the dielectric record member is a clear transparent, flexible film, which comprises a resin film base, a conductive layer on the base, and a dielectric layer thereon. The dielectric layer has a thickness of about 1.4–10 micrometers. In the preferred embodiment of the invention, the dielectric layer includes an anti-blocking material which enables the film member to be unrolled from a roll holder and transported at a controlled rate uniformly and rapidly across an energized electrode so that a sufficient amount of charge can be transferred from the electrode to the film to provide a high contrast image.

DETAILED DESCRIPTION OF THE INVENTION

Figure 1:
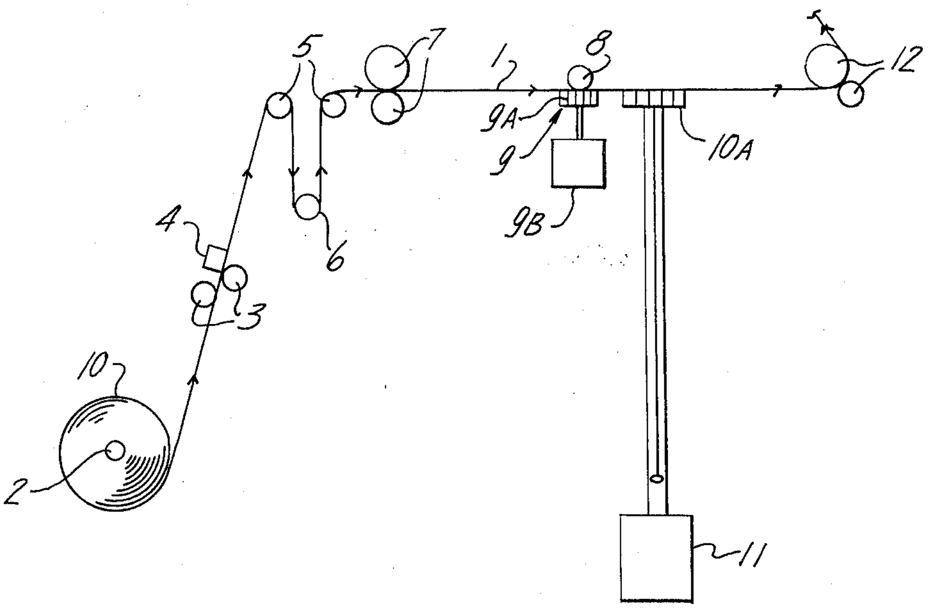
FIG. 1 is a schematic illustration of an electrographic printing system representative of the present invention.
Figure 2:
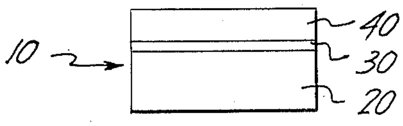
FIG. 2 illustrates the structure of the dielectric film record member of the invention.

Referring now to the drawings in detail, wherein like numerals indicate like elements, the electrographic printing system of the present invention is illustrated in FIG. 1. The system includes a roll of film 10, which is the dielectric film record member of the invention; its novel structure is shown in detail in FIG. 2. A typical dielectric film record member includes a transparent plastic base material 20, usually about 75–175 microns thick, although other dimensions may be used as well, which has a thin, substantially transparent, electrically conductive layer 30 applied to its surface. The conductive layer 30 has a resistivity value of less than $10^{10}$ ohms/square, and preferably less than $10^8$ ohms/square. It can be any conductive material, including organic and inorganic materials, such as quaternary ammonium salts, or polymers of vinyl pyridine with aliphatic esters, sulfonated polystyrenes, polyacrylic acid salts, lithium chloride, and the like. In addition, provided a substantial amount of transparency is maintained, metallized films can also be employed.

An adherent coating of a dielectric resin 40, i.e. a resin that has electrical insulating properties, is applied over the conductive layer 30. The thickness of the dielectric resin coating should be about 1.4–10 micrometers. Suitable dielectric resins include polyvinyl acetates, acrylics, styrenated acrylics, polyesters, polyvinyl butyral, polycarbonates, and other high dielectric resins.

In effect, by virtue of the presence of the conductive layer 30 in the film record member, the capacitance of the base 20 is changed relative to an energized electrode proximate thereto, which forms an electrostatic latent image thereon. For the observer, however, the base is virtually unchanged in thickness and transparency. The transferred electrostatic latent image on the dielectric coating has sufficiently high charge density to permit development by conventional electrographic techniques, such as with liquid or powder developers.

In the preferred form of the invention, an anti-blocking material is included in the dielectric layer. The anti-blocking material is mixed in with the dielectric material, i.e. it is suspended but not dissolved in the dielectric layer. The presence of the anti-blocking agent in the dielectric resin enables the dielectric film record member to be readily unrolled for transport through the printer to the electrode station, and wound onto a takeup reel. One useful anti-blocking material is particulate, high density polyethylene, such as Polymist®, which is commercially available in different several particle sizes. (Allied Chemical Co.) Synthetic silicas also can be used. Generally, such material is added in an amount of about 0.1 to 25% by weight of the coating.

In the best mode embodiment of the invention, the base material is a biaxially-oriented, linear polyester resin which may be treated with an adhesion promoting primer layer. The thus-treated resin film is coated on the primed side with a conductive layer. A typical conductive composition is prepared by dissolving 20 ml. of a sulfonated polystyrene in 80 ml. of water which contained 3 drops of a surfactant, such as Duponol G. The composition then is coated onto the polyester base to provide the conductive coating.

After drying, the conductive layer is overcoated with a dielectric layer, e.g. from a mix consisting of 10 l. toluene, 1500 g. (50% modified acrylic polymer is toluene) (Desoto 315), and 50 g. of polyethylene beads (Polymist A-12).

As shown in detail in FIG. 1, film member 10 is mounted on a free rolling shaft 2 so that when unrolled the dielectric-coated side of the film will be positioned to receive an image during the printing operation. The film is threaded through two fixed rollers 3 with a spring-loaded felt pad 4 pressing down on the film. In transit through the system, the film proceeds over movable rollers 5. When pressure is applied on a given fixed roller, the lid of the roller pushes the film between the two movable rollers 6 to form a loop of film. This loop enables the film to enter a humidity chamber (not shown) providing the film with a suitable ambient for printing. Two rubber rollers 7 fixed on the lid keep the film flat across the printing and toning stations. A small metal roller 8 positioned above a printing head 9 assists in maintaining a constant air gap between film and head.

In operation, the dielectric film member 10 is unrolled and passed over writing head 9 which contains a row of charging stylii 9A, which, when energized with a stylii pulse 9B, deposits an electric charge directly onto the film surface. The film then is advanced to a toning head 10A which floods the charged areas of the film surface with liquid toner. Excess liquid then is removed from the film surface and returned to the toner reservoir by a toner pump/vacuum system 11. The thus-toned film member then exits the machine through segmented rubber rollers 12.

The invention will now be described in further detail with reference to the following examples, although it be understood by those skilled in the art that the examples are presented for purposes of illustration only, and are not to be construed as limiting the scope and substance of the invention.

EXAMPLE I

In this example, the dielectric film record member is supported on a grounded electrode which is connected in series with a potential source and said image-bearing electrode whereby when the breakdown potential of the air between the electrodes is exceeded, an electrostatic latent image is generated upon said member.

An electrographic imaging system was established by placing a dielectric imaging member prepared in contact with a grounded base electrode which was connected through a potential source to a stylus electrode. In this manner, positive high voltage (+800 V) was applied through the stylus to the dielectric imaging member for square wave pulses durations of $1.5\times10-^{5}$ to $1\times10-^{1}$ seconds. An electrostatic latent image was generated on the dielectric imaging member in the form of a circular charge pattern equivalent to the contact area of the stylus employed. The resulting electrostatic latent image was developed employing a negative liquid developer composition, e.g. negative electrostatic liquid toner available from Hunt Chemical.

Good stylist images were thus obtained for applied pulse voltages of 450 to 800 volts $5\times10-^{5}$ seconds pulse time.

Under identical conditions, no image was obtained when a conventional polyester film having a thickness of 75 micrometers was employed. When the pulse time was increased to 0.5 seconds, and the applied voltage to 1000 volts, some charge in the stylus area appeared, but only randomly.

EXAMPLE II

The dielectric film record member of the invention is imaged and developed in the apparatus of FIG. 1 to provide clear, sharp, high-contrast images after developing. In operation, negative high voltage (−600 volts) was applied through the stylus to the dielectric film member using square wave pulses of 50 microseconds duration. An electrostatic latent image was generated on the dielectric film. The resulting electrostatic latent image then was developed using a positive liquid developer (Calcomp positive electrostatic liquid toner), and fixed with heat to provide a clear, sharp, permanent image on the film.

While the invention has been described with particular reference to certain embodiments thereof, it will be understood that certain modifications and changes may be made which are within the skill of the art. Therefore it is intended to be bound only by the appended claims.

What is claimed is:

1. In an electrographic printing system wherein a latent image is electrographically transferred to a dielectric record member from an image-bearing electrode in close proximity to said member, which image may be subsequently rendered visible by application of a toner and permanently fixed into said member, the improvement which is characterized in that:

(a) said dielectric record member is a transparent dielectric film comprising:
   (i) a transparent resin film base,
   (ii) a transparent permanently conductive layer on said base, and
   (iii) a transparent dielectric coating having a thickness of about 1.4–10 micrometers on said layer, and, wherein (b) means are provided to transport said film record member at a controlled rapid rate across said electrode, thereby to provide clear, sharp, high contrast images on said film.

2. The electrographic printing system according to claim 1 wherein said dielectric coating includes an anti-blocking material to enable said film record member to be unrolled without sticking.

3. The electrographic printing system according to claim 2 wherein said anti-blocking material is polyethylene or silica particles which comprise about 0.1–25% by weight of said dielectric resin.

4. The electrographic printing system according to claim 1 wherein the dielectric coating is selected from acrylics, styrenated acrylics, polyolefins, alkyd resins, polyester resins, polyvinyl resins, cellulose acetates, epoxide resins, copolymers of the above, and shellacs.

5. The electrographic printing system according to claim 1 wherein said electrode is a character, pin or stylus electrode.

* * * * *